No. 855,273. PATENTED MAY 28, 1907.
J. B. BARTHOLOMEW.
GRAIN FEEDING APPARATUS FOR THRESHING MACHINES.
APPLICATION FILED MAY 7, 1901.
4 SHEETS—SHEET 1.
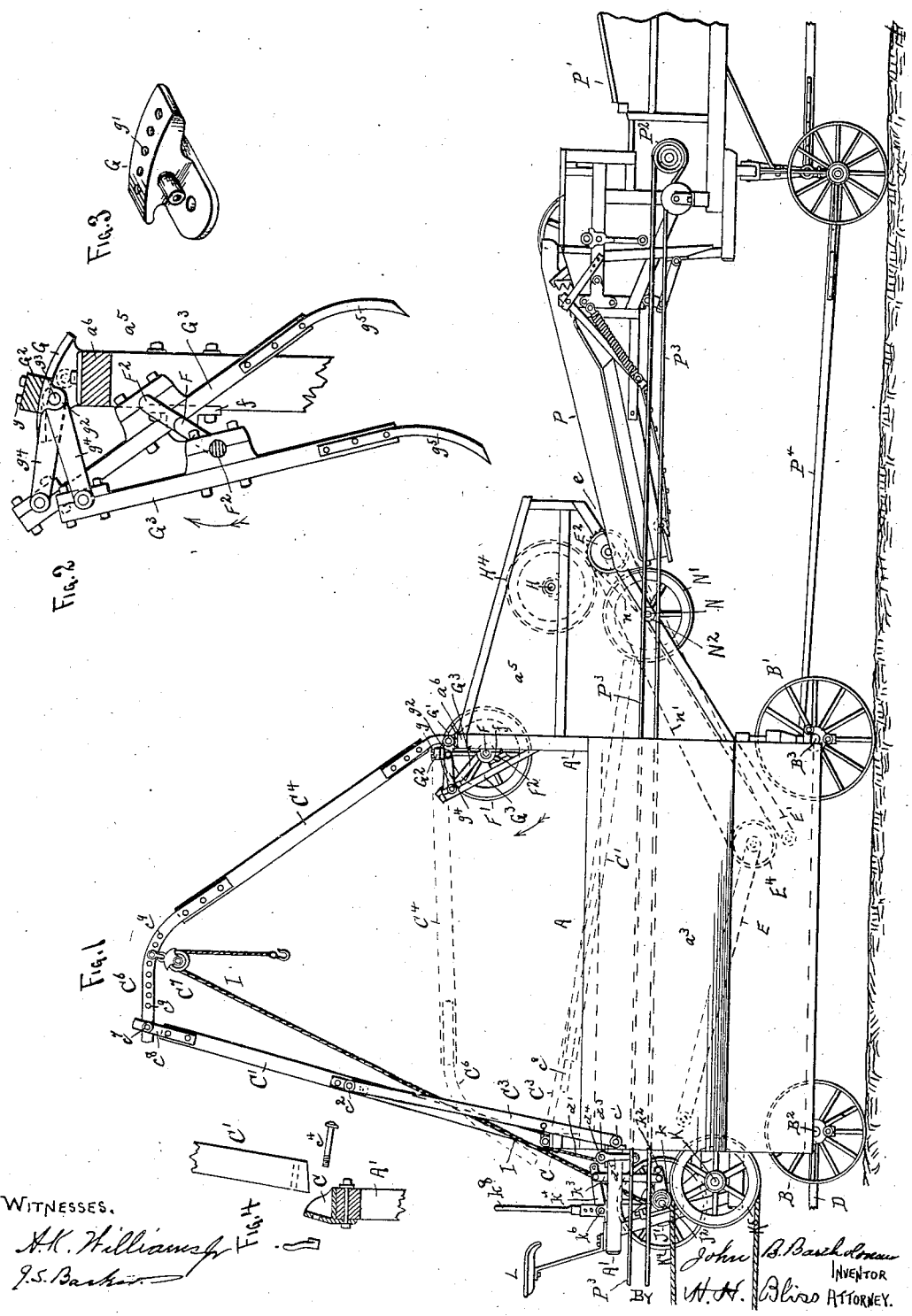

No. 855,273. PATENTED MAY 28, 1907.
J. B. BARTHOLOMEW.
GRAIN FEEDING APPARATUS FOR THRESHING MACHINES.
APPLICATION FILED MAY 7, 1901.
4 SHEETS—SHEET 2.
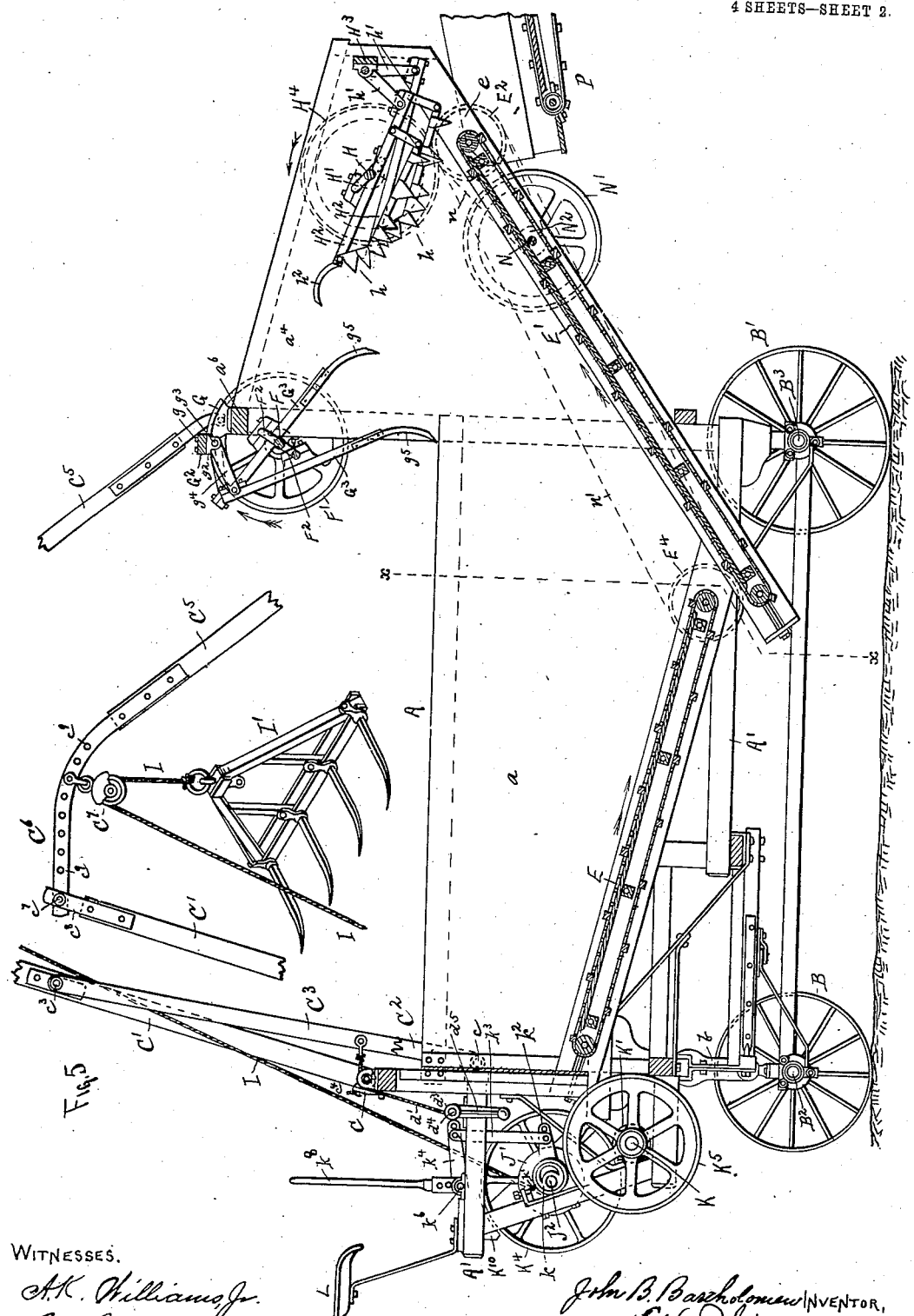
WITNESSES.
John B. Bartholomew INVENTOR,
BY ATTORNEY.

No. 855,273. PATENTED MAY 28, 1907.
J. B. BARTHOLOMEW.
GRAIN FEEDING APPARATUS FOR THRESHING MACHINES.
APPLICATION FILED MAY 7, 1901.
4 SHEETS—SHEET 3.
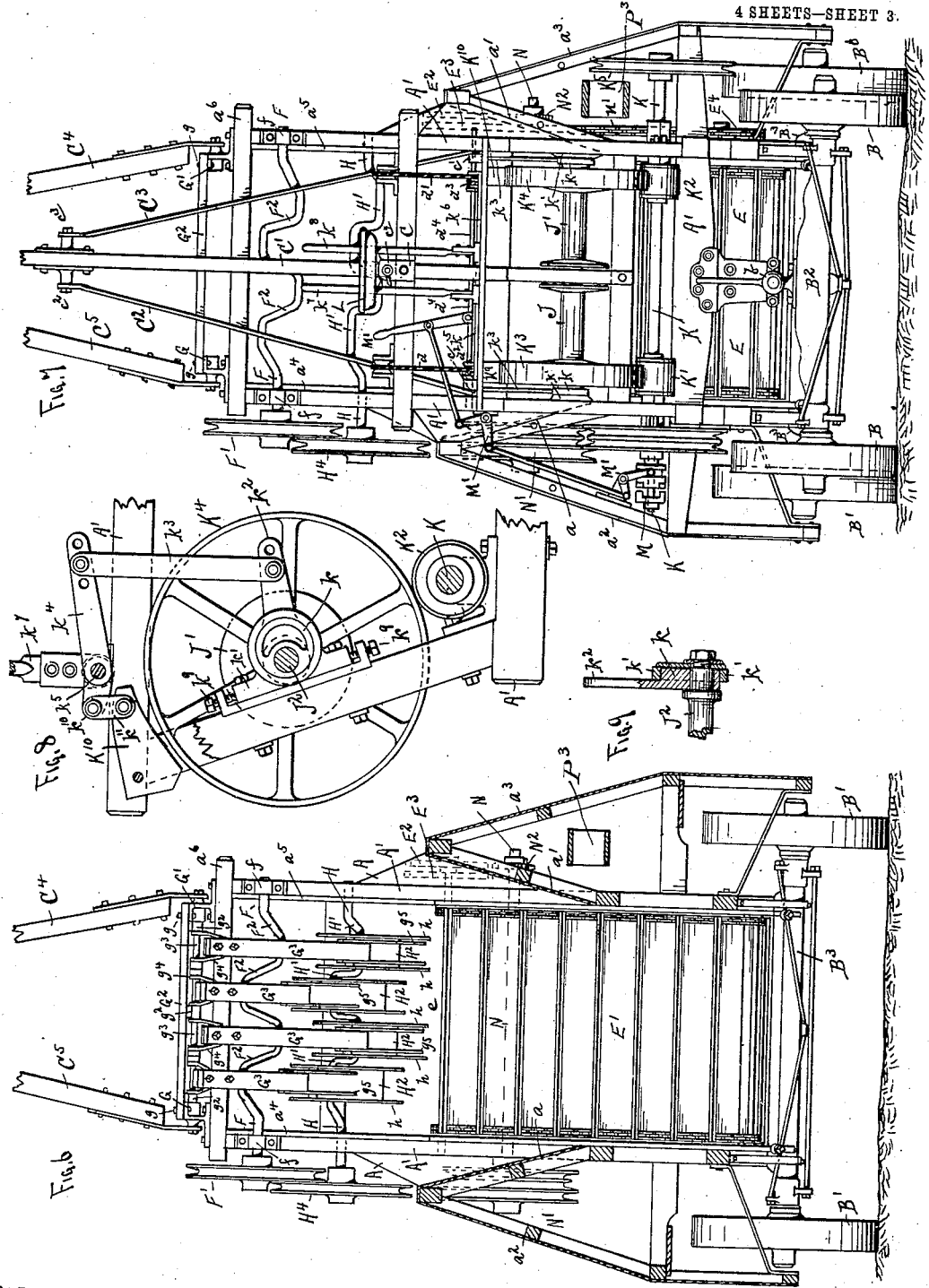
WITNESSES.
A.K. Williams Jr.
J.S. Barker
John B. Bartholomew INVENTOR.
By H.H. Bliss ATTORNEY.

No. 855,273.           PATENTED MAY 28, 1907.
J. B. BARTHOLOMEW.
GRAIN FEEDING APPARATUS FOR THRESHING MACHINES.
APPLICATION FILED MAY 7, 1901.
4 SHEETS—SHEET 4.
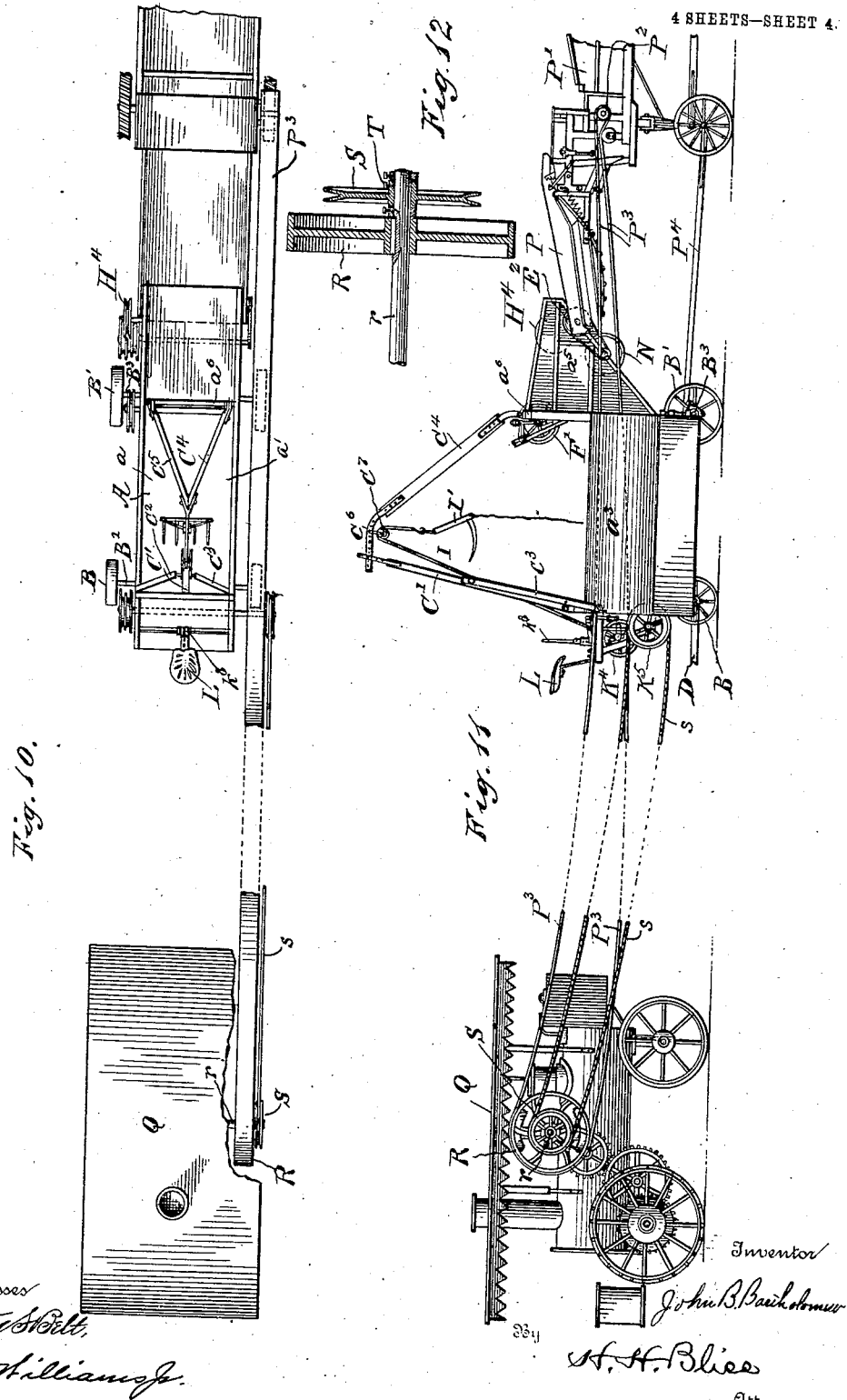

UNITED STATES PATENT OFFICE.

JOHN B. BARTHOLOMEW, OF PEORIA, ILLINOIS, ASSIGNOR, BY MESNE ASSIGNMENTS, TO AVERY MANUFACTURING COMPANY, OF PEORIA, ILLINOIS, A CORPORATION OF ILLINOIS.

GRAIN-FEEDING APPARATUS FOR THRESHING-MACHINES.

No. 855,273.      Specification of Letters Patent.      Patented May 28, 1907.

Application filed May 7, 1901. Serial No. 59,138.

*To all whom it may concern:*

Be it known that I, JOHN B. BARTHOLOMEW, a citizen of the United States, residing at Peoria, in the county of Peoria and State of Illinois, have invented certain new and useful Improvements in Grain-Feeding Apparatus for Threshing-Machines, of which the following is a specification, reference being had therein to the accompanying drawing.

Figure 1 is a side elevation of the apparatus complete. Figs. 2 and 3 are enlarged details of the retarder sway bar mechanism. Fig. 4 is an enlarged detail representing the construction of the derrick standard step. Fig. 5 is an enlarged sectional side elevation of the apparatus. Fig. 6 is a transverse section on the line $x, x$ of Fig. 5, looking toward the rear. Fig. 7 is a front elevation. Figs. 8 and 9 are enlarged details of one of the fork actuating drums and the mechanism for operating it. Fig. 10 is a side elevation, and Fig. 11 is a top plan view illustrating the arrangement of the threshing machine, the pitching and feeding apparatus and the traction engine, which operates as the motor for these parts, with relation to each other; and which also illustrates the arrangement of the belting and driving gearing between the engine and the two independent mechanisms which it drives. Fig. 12 is a detail view.

This apparatus is designed to be employed more particularly in handling unbound grain, such as that cut by "headers" and the like, but may also be employed in connection with bound grain under some circumstances. The apparatus is employed in connection with threshing machines, and is intended to receive the grain in irregular masses and distribute it and feed it out to the threshing mechanism in a uniform sheet or stream in the proper condition for the action of the latter.

The apparatus consists of a relatively deep hopper for the reception of the grain and having reversely inclined carriers in the bottom for advancing the grain therefrom toward the threshing machanism, and with mechanism above the carrier to retard the grain and distribute it, and a mechanism adjacent to the discharge of the hopper to feed the grain to the threshing mechanism, whereby the grain may be supplied to the hopper in large irregular masses and distributed therein and fed therefrom in a uniform sheet or stream to the threshing mechanism in proper condition for the action of the latter.

A represents the hopper supported by a framework A' and mounted upon carrier wheels B, B', the latter supported upon axles $B^2$, $B^3$, the forward axle $B^2$ being swiveled centrally as at $b$, and provided with a tongue D by which it may be drawn forward. The hopper A is formed with outwardly flaring sides $a$, $a'$ and with reversely inclined hoods or housings $a^2$, $a^3$ forming coverings and protectors for the wheels B, B' and the driving mechanism, as shown. In the bottom of the hopper are two slatted belt carriers E, E', the carrier E inclined downward toward the central portion of the hopper and the carrier E' inclined upward and toward the discharge end of the hopper. The lower end of the carrier E overlaps the lower end of the carrier E' and both travel in the direction of the arrows in Fig. 5, so that the grain falling upon the carriers will be carried thereby toward the upper end of the carrier E' to the point $e$.

The framework A' is extended upward at $a^4$, $a^5$ and provided with a transverse crank shaft F journaled at $f$ to the extensions and provided on one end outside the casing with a rope drive pulley F' by which the shaft may be driven. The extensions $a^4$, $a^5$ are provided with a transverse girth $a^6$ upon which two brackets G, G' are secured, these brackets having curved upper surfaces, as shown in Fig. 3, which represents one of them detached. $G^2$ is a transverse beam secured by its ends as by bolts $g$ to the brackets G, G' and adapted to be adjusted thereon as indicated by the series of holes $g'$ in the brackets. Attached to the under side of the beam $G^2$ are a series of hangers $g^2$ in which a rod $g^3$ is journaled, the rod affording means for supporting pivotally a series of hanger arms $g^4$ the outer ends of the hanger arms being pivotally connected to the ends of sway bars $G^3$, as shown. The sway bars are journaled to the cranks $F^2$ of the shaft F, and are each armed with curved tines or fingers $g^5$, as shown. The shaft F being revolved in the direction of the arrows in Figs. 1, 2 and 5, the fingers $g^5$ will act reversely to the movement of the straw and thereby retard it, as hereinafter more fully described. H is another transverse shaft journaled in the extensions $a^4$, $a^5$ above the upper end of carrier E' and provided with a series of cranks H', each crank pivotally connected to a sway bar $H^2$. Each sway bar $H^2$ is provided with a series of teeth $h$ and pivotally connected by its lower end by arms $h'$ to a transverse support $H^3$ on the framework A'. One or more of the sway bars H', $H^2$ are provided with an upwardly curved finger $h^2$, as shown in Fig. 5. By this means if the shaft H be revolved in the direction of the arrows in Fig. 5, the teeth $h$ will act upon the grain as it is carried upward by the carrier E' and carry it forward and assist in its discharge. In Fig. 7 the two sets of sway bars are removed for clearness of illustration. The shaft H is provided on one end with a rope pulley $H^4$ by which it may be driven. N is another transverse shaft journaled through the extension $a^4$, $a^5$ inside the carrier E', and with a rope drive pulley N' on one end, and a chain pinion $N^2$ on the other by which the carrier E' may be driven through the medium of a chain (indicated by dotted lines $n$ in Figs. 1 and 5) leading to a chain pulley $E^2$ on the upper shaft of the carrier E'.

The carrier E will be driven as by a chain indicated by dotted lines $n'$ in Figs. 1 and 5, leading from a chain wheel $E^3$ on the upper shaft of the carrier E' to a corresponding chain wheel $E^4$ on the lower shaft of the carrier E', as indicated by dotted lines in Figs. 1 and 5.

Stepped at its lower end in a socket C on the framework A' is a standard C' rising upward and inward over the hopper A and supported by side braces $C^2$, $C^3$ pivoted at their lower ends at $c$, $c'$ to the framework A', and also pivoted at $c^2$, $c^3$ to the standard C', and thereby forming braces and supports to the standard, the latter being further secured in the socket C by a bolt $c^4$. $C^4$, $C^5$ are two other standards pivoted at their lower ends in the brackets G, G' on the beam $a^6$ and rising upward and backward over the hopper A, and united to a curved bar $C^6$, which is in turn connected by pivot bolt $c^7$ to straps $c^8$ on the standard C', the whole forming a derrick like frame above the hopper and affording means for supporting the hoisting forks. The curved bar $C^6$ is provided with a series of holes $c^9$ by which a rope pulley $C^7$ may be suspended and adjusted along the bar.

Two or more of the rope pulleys will be employed each designed to support a rope I leading to a hoisting fork I' of any approved form.

Only one of the forks and its pulley and rope is shown, but it will be understood that two or more will generally be employed.

The ropes lead from the pulleys $C^7$ to two drums J, J' on a transverse shaft $J^2$ journaled upon the framework A', as shown.

K is another transverse shaft journaled across the framework A' and carrying friction pinions K', $K^2$ engaging the rims of friction wheels $K^3$, $K^4$ loose upon the shaft $J^2$, each wheel $K^3$, $K^4$ having one of the drums J, J' connected thereto so as to revolve therewith. Upon the shaft K is a rope sheave $K^5$ to which the power to operate the apparatus will be applied.

The ends of the shaft $J^2$ are journaled in eccentrics $k$ and the eccentrics in turn journaled in bearings $k'$ on the framework A', and each eccentric provided with an arm $k^2$ connected by links $k^3$ to arms $k^4$ on transverse shafts $k^5$, $k^6$, each shaft having a lever $k^7$, $k^8$, by which the shafts may be oscillated. By this simple arrangement if the levers $k^7$, $k^8$ be moved in one direction, the eccentrics will be turned in the bearings $k'$ and thus force the wheels $K^3$, $K^4$ into frictional contact with the pinions K', $K^2$, and thus transmit the motion of the shaft K to the drums J, J' and actuate the forks I' as required.

The bearings $k'$ are adjustable by set screws $k^9$ upon the supporting framework A', as shown in Figs. 1, 5 and 8, to regulate the position of the eccentrics and to take up the lost motion when required.

Above each wheel $K^3$, $K^4$ is a brake shoe $K^9$, $K^{10}$ adapted to be actuated by an arm $k^{10}$ and link $k^{11}$ from the shafts $k^5$, $k^6$, so that the backward motion of the levers $k^7$, $k^8$ may be utilized to actuate the brake shoes—see Fig. 8.

The eccentrics $k$ are actuated by moving the levers $k^7$, $k^8$ inward toward the body of the hopper, which action will elevate the brake shoes and render them non-effective; likewise the backward movement of the levers will elevate the eccentrics and render them non-effective, but will depress the brake shoes and render them effective by pressing them downward in contact with the friction rims of the wheels $K^3$, $K^4$. Thus the brakes and the eccentrics will be both actuated by one set of levers.

L is the operator's seat from which all the levers can be reached, and being elevated enables him to overlook the hopper and the discharge mechanism and bring him into position to control its action.

The derrick is foldable, as indicated by dotted lines in Fig. 1, so that it can be lowered down when not in use, and when the machine is to be transported.

The braces $C^2$, $C^3$ of the derrick are supported by ropes $d$, $d'$ leading to drums $d^2$, $d^3$ on a transverse shaft $d^4$, on the framework A', the shaft adapted to be actuated by a crank $d^5$, as shown, the winding up of the ropes $d$, $d'$ upon the drums serving to draw the braces $C^2$, $C^3$ and the standard C' "home," and firmly hold the whole derrick in position.

When the derrick is to be folded down, the ropes $d$, $d'$ are eased off and the standard C' released from its holding bolt $c^4$ and lifted from its step C, and moved inward into the hopper A, which will enable the standards C⁴, C⁵ to be likewise folded down. By removing the pivot bolt c⁷ the derrick may be folded into a still smaller space. When the derrick is thus folded, the machine is in condition for removal.

A clutch M is connected to the shaft K and arranged to be actuated from the operator's platform, as by a system of levers M', so that the mechanism may be readily controlled by the operator and thrown in and out of gear when required.

In operating the device, it is set up with the discharge e adjacent to the intake end of the band cutter and feeder of a threshing machine, as indicated in Figs. 1 and 5, P indicating a band cutter and feeder of an approved form, and P' a portion of the feed end of a threshing machine, in which P² indicates the drive pulley and P³ the driver-belt, the latter shown passing backward through the housing a³ of the pitcher apparatus, the housing thus serving as a shield to the belt.

When employed in threshing unbound grain the band cutting feature of the cutter and feeder P will not be required and may be removed or utilized only as an assistant to the feeding mechanism.

The pitcher or feeding apparatus may be coupled to the threshing machine and its attachments by the tongue P⁴ of the latter, and the tongue D of the pitcher apparatus may be utilized for connecting it to a traction engine or other motor when it is desired to transport the apparatus. Thus the three devices, namely, the pitcher, the band cutter and feeder, and the threshing machine, may be retained at all times in their proper relative positions and no time need be lost in rearranging them when ready for work.

In Figs. 10 and 11 I have illustrated the preferred method of driving the pitcher or feeding mechanism and the thresher; that is I drive these two mechanisms or apparatus each independently from the same motor. Referring particularly to these figures Q represents a traction engine which may be of any approved type, and which serves as the motor for the two mechanisms referred to, and may also be employed for transporting them from place to place. R is the band wheel of the traction engine mounted upon the engine shaft r and with this wheel engages the belt P³ which passes to the pulley on the end of the shaft of the thresher cylinder as represented in Fig. 1. This belt therefore serves to transmit the power required for driving the threshing mechanism. S represents a grooved wheel or pulley with which engages a power-transmitting rope s that passes to and engages with the rope sheave or pulley K⁵ upon the main shaft K of the pitcher or feeding apparatus. The wheel S is mounted upon the shaft r being secured thereto in any suitable manner as by a pin T. In order to permit of the feeding mechanism being stopped without at the same time necessitating the stopping of the threshing machine, I preferably make the pin T easily removable, and by this arrangement the wheel S may be thrown into or out of operative connection with the main engine shaft r as desired. The independent driving gearing for the thresher and the feeder, respectively, are so arranged as to impart the proper speeds to the parts which they drive. Thus, as represented, the belt P³ gives a relatively high speed to the thresher cylinder, while the belt or rope s gives a much slower speed to the wheel K⁵ and its shaft, from which the various parts of the feeding mechanism derived their movements.

I am aware that it has heretofore been proposed to combine a threshing machine, a feeder therefor, and a traction engine which drives both the feeder and the thresher; but so far as I am aware it has always been the practice either to belt the traction engine directly to some part of the threshing machine, such as its cylinder shaft, and then to connect and drive the feeder from the threshing machine; or else to belt the traction engine directly to a shaft of the feeder mechanism, and then to connect the threshing machine with this shaft on the feeder. In either case but a single belt is employed between the traction engine and the part which it primarily drives. It therefore follows that the entire strain incident to the operation of both the threshing machine and the feeding mechanism therefor is borne by this one shaft and the frame-work which supports it, with the result that the apparatus which is belted direct to the traction engine is frequently unduly strained, or else had to be made objectionably heavy to withstand the strains, vibrations and shocks to which it is subjected. By the arrangement which I have shown where entirely independent driving connections are employed between the traction engine and the thresher and the feeder, respectively, I so divide the strain that each machine can be operated steadily and without undue wear and tear. A further advantage incident to the arrangement of driving gearing which I have shown is that I am enabled to entirely stop the operation of the feeding mechanism, as for instance, should it become choked with material, without at the same time stopping or interfering with the operation of the threshing machine which was not possible in the older constructions of which I have knowledge.

In operating the device the outfit is set up with the pitcher or feeder apparatus contiguous to the stack of grain to be threshed, or preferably between two stacks of such grain, so that the supply can be drawn from each side. The preferable location is midway between two stacks, so that the two forks I' may be used alternately on both sides of the hopper A, but the pitcher can be employed in connection with one stack, the two forks being employed alternately and both pitching in from the same side of the hopper.

When properly set up the forks are alternately loaded and hoisted up by the action of the drums J, J' and the loads dumped into the hopper A in large irregular masses. The revolving carriers acting beneath the mass of loose grain move it forward and upward where it meets the backwardly acting fingers $g^5$ which break down the top portion of the straw and move it backward into the hopper and spread it out into a comparatively uniform sheet and prevents large masses passing to the sway bars $H^2$. The grain is thus fed up the inclined carrier E' in a uniform sheet and is thus presented to the sway bars $H^2$ in proper condition to be handled by them and fed forward and discharged from the machine at $e$ in a uniform or even sheet, and in proper condition to be handled by the feeder mechanism P. Thus no matter how tangled and irregular the grain may be, and no matter how irregular and varied the masses pitched into the hopper by the forks I' may be, the apparatus will straighten it out and feed it to the threshing mechanism in a uniform regular sheet or stream, and in the best possible condition for the proper action of the threshing mechanism.

The speed of the carriers E, E' may be varied as required, and either may be run faster than the other if circumstances require it.

By adjusting the bar $G^2$ upon the curved brackets G the throw of the fingers $g^5$ may be adjusted to the condition or quality of the grain and perfectly adapted to the work required of them.

The shields $a^3$, $a^4$ serve an important function in protecting the driving machinery and the carrying wheels and running gear from the straw as it is dragged upward over the edges of the hopper by the forks. The sides of the hopper are covered over, as shown, to afford a smooth unbroken surface and present no obstructions to the grain as it is drawn over them by the forks.

What I claim is:—

1. The combination of a threshing mechanism, means for gathering straw from points remote from the threshing mechanism, means for feeding the gathered straw toward the cylinder of the threshing mechanism, an engine arranged on the side of the gathering and feeding mechanisms opposite the threshing mechanism, a driving belt connecting the engine shaft with the gathering and feeding mechanisms, a separate and independent driving belt connecting the engine with the threshing mechanism, said belt extending past the gathering and feeding mechanisms, and hoods extending outward from the gathering and feeding mechanisms and protecting the belt from the threshing mechanism, and over which the straw is drawn by the gathering mechanism, substantially as set forth.

2. In a threshing apparatus, the combination of a threshing mechanism on a transporting truck, the straw feeding mechanism on an independent transporting truck and having a straw dragging mechanism adapted to drag the straw from remote points, feeding mechanism adapted to advance the straw in a stream toward the threshing mechanism, and having a hood or straw guide $a^3$ at its side, an engine mounted upon independent ground wheels or trucks, a drive belt extending from the engine to the feeding mechanism, and a drive belt extending from the engine to the thresher mechanism and arranged to lie under said straw hood the threshing mechanism, the straw-feeding mechanism, and the engine being arranged in line with each other in the order named, substantially as set forth.

3. In a straw feeding machine of the class described, the combination of the hopper, means for gathering straw from remote points into the hopper, the endless carrier E' inclined forward and upward, the endless carrier E inclined forward and downward and arranged to exert a feeding pressure upon the straw toward the carrier E' said carriers being arranged in the lower part of said hopper, the reciprocating devices $G^3$ arranged to throw backward the top portions of the straw, and the straw pressing and advancing device above the path of the straw at the place of its escape from the endless carrier E' and adapted to press the straw down and deliver it in a substantially uniform stream, substantially as set forth.

4. In a feeding mechanism of the class described, the threshing machine, a wheel truck, a straw hopper thereon, a straw gathering fork, the straw advancing mechanism in the bottom of the hopper, the fork rope I, the rope winding device, the prime power shaft, the frictional power transmitting device between the power shaft and the rope winding mechanism a brake shoe, and means for adjusting the frictional power-transmitting device either into operative engagement with said power shaft or into engagement with said brake shoe, substantially as set forth.

5. In a straw feeder of the class described for threshing machines, the combination with the fork, the fork rope, the elevated rope pulley, the feeder frame and the straw receiving hopper thereon, of a derrick frame having the front bars mounted on said feeder frame and adapted to swing forward and backward longitudinally of the machine, and the rear bar having one end detachably secured to the feeder frame and the other end pivotally secured to the outer ends of the front bars, whereby when the lower end of the rear bar is detached from the feeder frame, the rear and front bars can be folded down upon the machine, the former below the latter, without disconnecting them, substantially as set forth.

6. In a straw feeder of the class described for threshing machines, the combination with the fork, the fork rope, the elevated pulley, the feeder frame, and the straw receiving hopper, of a derrick frame having the front bars mounted on said feeder frame and adapted to swing forward and backward longitudinally of the machine, the rear bar having one end detachably secured to the feeder frame and the other end pivotally secured to the outer end of the front bars, and the brace rods pivotally secured to the feeder frame and to the said rear bar, whereby when the said end of the rear bar is detached from the feeder frame the rear and front bars and brace rods can be folded down upon the machine without disconnecting any of their pivotal connections.

7. In a straw-feeding mechanism, the combination of a hopper-like receiver into which the loose straw is delivered in irregular masses, an endless carrier in the bottom of the hopper inclining downward and forward, another endless carrier in the bottom of the hopper inclining upward and forward, the first-named carrier being arranged to deliver to the second, and reciprocating devices disposed above the second-named carrier and arranged to act upon the top portions of the straw carried thereby to throw the same backward, substantially as set forth.

In testimony whereof I affix my signature in presence of two witnesses.

JOHN B. BARTHOLOMEW.

Witnesses:
A. L. GREGORY,
LEE W. HAZARD.